United States Patent [19]

Gorman

[11] 3,853,525
[45] Dec. 10, 1974

[54] GLASS SHEET CONVEYING AND SUPPORTING ROLLS, AND APPARATUS EMPLOYING SUCH ROLLS

[76] Inventor: Harold R. Gorman, 829 Fifth St., Oakmont, Pa. 15139

[22] Filed: Aug. 2, 1973

[21] Appl. No.: 385,018

[52] U.S. Cl.............. 65/181, 65/193, 65/253, 65/374, 29/132
[51] Int. Cl............................................ C03b 35/00
[58] Field of Search ............. 65/374, 181, 193, 253; 29/132

[56] References Cited
UNITED STATES PATENTS

| 3,141,756 | 7/1964 | Giffen | 65/374 X |
| 3,317,303 | 5/1967 | Shorr | 65/374 X |
| 3,492,109 | 1/1970 | Robinson et al. | 65/253 X |
| 3,783,013 | 1/1974 | Seeman | 65/374 X |

Primary Examiner—Arthur D. Kellogg
Attorney, Agent, or Firm—William J. Uhl

[57] ABSTRACT

Disclosed is a roll useful in glass manufacturing for supporting and conveying at elevated temperatures solid glass sheeting. The roll contains boron nitride in its material supporting surface which has been found to prolong roll life and to minimize deformation of and adhesion to the surface of the glass sheeting engaging the roll.

8 Claims, 3 Drawing Figures

GLASS SHEET CONVEYING AND SUPPORTING ROLLS, AND APPARATUS EMPLOYING SUCH ROLLS

BACKGROUND OF THE INVENTION

1. Field of the Invention. This invention relates to novel rolls for supporting and conveying sheeting, particularly glass sheeting at a temperature within its annealing range, and to apparatuses employing such rolls.

2. Brief Description of the Prior Art. Rolls for supporting annd conveying sheeting material at elevated temperatures are of particular importance in the glass industry. Such rolls are used for conveying glass sheeting through an annealing lehr and as take-off rolls in a float glass operation which remove a formed ribbon of glass from a molten metal bath and transfer it into an annealing lehr. These rolls are subjected to very high temperatures, generally on the order of about 900° to 1600°F., and are typically made of a heat-resistant material, such as asbestos or stainless steel. Typical asbestos rolls are described in U.S. Pat. No. 3,317,303 to Shorr and U.S. Pat. No. 3,692,509 to Breiner. Although asbestos rolls are used rather extensively in the glass industry, they have a number of disadvantages associated with them. The asbestos rolls, although initially of uniform roundness, often become irregular in shape because of continuous contact with hot glass. When this occurs, the rolls tend to mar the bottom surface of the glass. This is known in the art as "roll scuffing."

In addition, in the float glass process such as described in Pilkington U.S. Pat. No. 3,083,551, a continuous ribbon of float glass is frequently marred by a defect referred to in the art of "art imprinting." Roll imprinting is caused by a deposit which builds up on the take-off rolls and on the lehr rolls located in the forward part of the lehr. These deposits are believed to be tin compounds, probably tin oxide, which is carried by the float glass as it is removed from the molten tin bath. These deposits transfer from the bottom side of the float glass ribbon to the take-off and lehr rolls where they adhere tenaciously to the rolls. Also, deposits believed to be $Na_2SO_4$ and/or $Na_2SO_3$ can form on the lehr rolls when $SO_2$ gas is injected into the lehr to provide lubricity to the roll surface. The deposits from whatever source build up and eventually will mark or print the bottom surface of the glass, hence the name "roll imprinting."

Besides the above-described disadvantages, it has also been found that the continuous passing of hot glass sheet over the conveying rolls exerts considerable wear such that the rolls, particularly asbestos rolls, have relatively short lives, on the order of about one week to nine months, depending on the location of the roll. The take-off rolls and the lehr rolls which are located where temperatures are the highest, that is, on the order of 1,200°F. to 1,600°F., have the shortest life of about one to two weeks of continuous operation, whereas lehr rolls in the middle or end portions of the lehr where temperatures are lower, i.e., about 200° to 600°F., have somewhat longer lives, on the order of about eight to nine months of continuous operation.

It is therefore an object of this invention to provide a glass supporting and conveying roll which eliminates or significantly minimizes many of the aforementioned problems of the conventional asbestos and stainless steel conveying and supporting rolls of the prior art. Specifically, it is an object of the invention to provide a conveying and supporting roll which reduces roll damage to the glass sheet such as roll scuffing and roll imprinting. It is a further object of this invention to provide a supporting and conveying asbestos roll which has a prolonged working life over conventional asbestos rolls heretofore used in the prior art.

SUMMARY OF THE INVENTION

According to this invention, there is provided a roll useful in glass manufacturing and especially adapted for supporting and conveying at elevated temperatures flat glass sheeting. The roll contains in its material supporting surface boron nitride. In a preferred embodiment, the roll has an asbestos supporting surface which contains a coating of boron nitride which adheres to the asbestos surface. The roll can be used as a lehr roll or as a take-off roll for a float glass-producing line. The self-lubricating properties of the boron nitride minimize friction between the roll and the glass thus prolonging roll life and significantly reducing roll scuffing and roll imprinting.

The invention also provides for an apparatus employing such rolls, such as an annealing lehr.

PERTINENT PRIOR ART

Boron nitride has been disclosed in the art for use in glass engaging edge rolls of a float glass tank in U.S. Pat. No. 3,492,109 to Robinson et al. and for use in fiber optic stacks in U.S. Pat. No. 3,607,197 to Ballantine. However, the utility of boron nitride for use for glass handling and conveying rolls is novel.

DETAILED DESCRIPTION OF THE INVENTION

Figure 1:
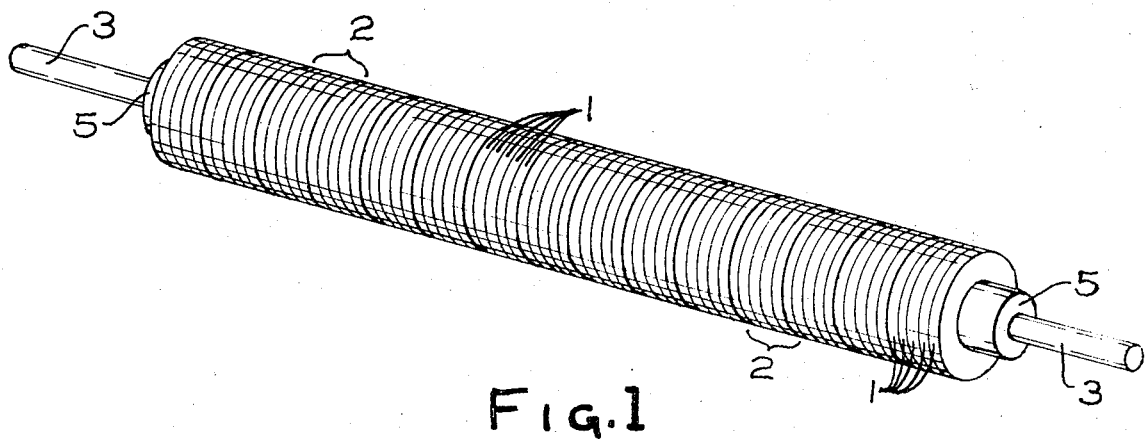
FIG. 1 illustrates a typical material conveying and supporting roll according to the practice of the invention.
Figure 2:
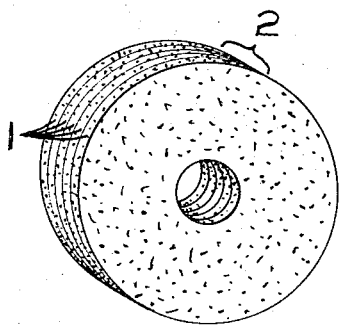
FIG. 2 illustrates an asbestos disc which is used in the manufacture of the roll of FIG. 1.

FIG. 1 shows a typical asbestos roll for supporting and conveying a sheeting material, particularly glass sheeting, at elevated temperatures. The rolls include a support or mandrel 3, which is metal and usually made of steel. Onto this mandrel are positioned a number of asbestos discs 2. The discs are made from a plurality of thinner discs which have a thickness of about ¼ inch. Usually about three to seven of these thinner discs are cut from boards formed of an asbestos fiber-binder mixture. The thinner discs are nailed together to form the disc represented by numeral 2 in the drawing. The thicker discs 2 are placed on the mandrel 3 and subjected to a squeezing pressure of about 1,000 to 1,200 pounds per square inch to adhere the discs together to produce the roll 1. The discs are maintained in position by the collars 5 located at the opposite ends of the mandrel. The resulting asbestos roll 1 is then lathe turned to insure a true roundness.

The asbestos which is used can be chrysolite asbestos or asbestos fibers such as described in U.S. Pat. No. 3,317,303 to Shorr. The asbestos fibers are selected from anthophyllite asbestos, amosite asbestos, tremolite asbestos, actinolite asbestos and mixtures thereof with one another and with chrysolite asbestos. A preferred asbestos is one which contains at least 30 percent by weight anthophyllite asbestos. A binder such as calcium silicate is used to hold the asbestos fibers together.

Asbestos fiber-binder mixtures such as described in U.S. Pat. No. 3,692,509 to Breiner are also suitable in the practice of this invention.

After the asbestos roll has been formed, it can then be treated with boron nitride. The boron nitride can be applied to the roll by any of a number of the conventional means for applying a surface coating, for example, by brushing, spraying or dipping. Spraying is preferred because it provides an extremely even coating which adheres well to the asbestos roll. Aqueous boron nitride solutions are commerically available from Carborundum Corporation under the trademark COMBAT coatings. These solutions are gels of boron nitride, plus a high temperature inorganic binder, such as alumina, magnesium silicate and aluminum phosphate, in an aqueous vehicle. Examples of suitable and commercially available boron nitride gels are Type S, Type V and Type A of the aforementioned COMBAT coatings, with Type S and Type A being preferred.

In general, the boron nitride coating solutions should have the following ranges of ingredients:

| Ingredient | Percent by Weight Broad Range | Preferred Range |
| --- | --- | --- |
| boron nitride | 5 – 60 | 10 – 55 |
| binder | 0.5 – 30 | 1 – 15 |
| water | 30 – 90 | 35 – 85 |

The percentages by weight being based on the total weight of boron nitride, binder and water. Besides these ingredients, other optional ingredients such as surface active agents, viscosity controlling agents, thermal stabilizers and anti-oxidants can also be included in the composition. Also, solvents other than water can be used such as lower aliphatic alcohols or water-alcohol mixtures. Water, however, is preferred because of its cheapness and its excellent solvent power for boron nitride.

Brushing and dip coating generally result in a thicker coating than that obtained by spraying. For brushing and dip coating, higher solid solutions can be employed, i.e., on the order of 45 and 55 percent by weight solids, whereas for spraying, more dilute solutions, on the order to 5 to 35 percent be weight solids, should be used so as not to clog the spray gun. Of course, these more dilute solutions can also be used for brushing or dip coating. When the roll is to be used at lower temperatures, i.e., on the order of 200° to 600°F., one coating may be sufficient, although two are recommended to insure complete coverage. For higher temperature use, at least two coatings should be applied to the rolls. If more than one coating is applied, there should be at least 20 to 60 minute air drying period between coatings. The thickness of the final coating depends on the number of coatings applied and the total solids content of the coating composition. Accordingly, coating thickness of from 0.5 to 100 and preferably 1 to 10 mils are useful in the practice of the invention. Coating thickness greater than 100 mils offer no added advantage and may spall from the support. Coatings much thinner than 0.5 mil abrade very quickly from the roll surface. The higher the intended use temperature the roll will be exposed to, the thicker the coating should be. The coatings can be characterized as continuous, smooth and bubble-free. The coating thicknesses referred to above are dry coating thicknesses measured after the curing operation which is discussed below.

After the coating has been applied by either brushing, dipping or spraying, it is usually cured to remove the volatile constituents and to deposit a smooth, uniform, continuous coating of BN and binder onto a roll. The curing treatment usually involves a first air drying period of about 1 to 10 hours at about room temperature to 200°F. to remove the volatile constituents. Temperatures much greater than 200°F. are not recommended in the initial curing stages because of the danger of water boiling away, which would result in a bubbly coating. After the air drying period, the coating is then baked at a temperature of about 200°F. to 1,500°F. for about 2 to 6 hours to form a smooth, harad coating which adheres strongly to the roll surface. Generally, higher temperatures result in a harder coating which has better adherence to the roll. Thus, where the coating is to be used on take-off rolls and on high temperature lehr rolls, the baking temperature should be relatively high, on the order of about 1,200°F. to 1,500°F. On the other hand, when the coating is to be used for a glass handling roll or for a lehr roll, which are operated at lower temperatures, lower baking temperatures of about 200°F. to 500°F. are satisfactory. After baking, the roll is ready for use, for example, in a float glass-producing apparatus.

Figure 3:
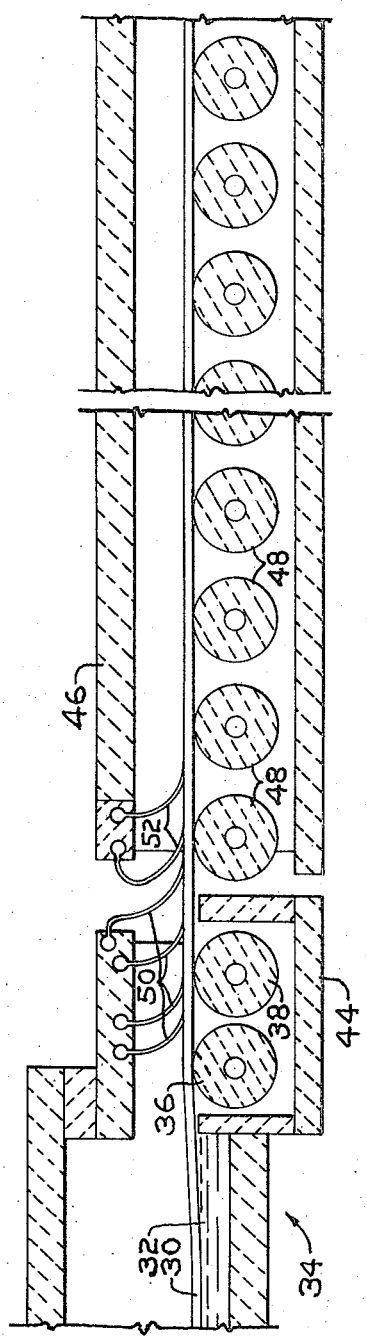
FIG. 3 is a longitudinal section through a typical float glass apparatus showing the take-off and lehr rolls at the entry portion of the annealing lehr.

FIG. 3 shows a longitudinal section through a portion of a typical float glass-producing apparatus. Here, a ribbon of glass 30 has been treated on a bath 32 of molten liquid, such as molten tin or tin alloy or other material contained within a tank 34, and is lifted from the bath at the exit end of the tank by rolls 36 and 38 suitably journaled and driven by means not shown.

The glass is conveyed into an annealing lehr 46 having a plurality of lehr rolls 48 therein. Means (not shown) such as a chain drive are provided for driving the rolls. Each roll exerts a tractive force on the glass of sufficient magnitude to convey the glass through the lehr where its temperature is controlled to release permanent stress and strain in the glass. Protective reducing atmosphere, such as nitrogen, with perhaps a small percentage of hydrogen, is maintained over the bath 32 within the tank 34 in order to protect the bath from oxidation. Generally, the atmosphere contains 90 to 99.9 percent nitrogen and the remainder hydrogen. The atmosphere is maintained at a slight pressure above ambient pressure as, for example, 0.1 to 0.5 inch water, to substantially prevent the ingress of the ambient atmosphere within the tank 34. To retain the atmosphere and to permit the passage of glass ribbon from the tank 34, the exit end of the tank is provided with a series of curtains or drapes 50, which trail on the glass ribbon. These drapes or curtains are usually made of an asbestos material which will not mar the glass and will withstand temperatures involved, which are approximately 1,000°F. to 1,200°F. These curtains can be impregnated with a boron nitride solution to provide self-lubricating properties which assists in protecting the glass which passes beneath the curtains. Also, boron nitride blocks (not shown) can be pressed upon the rolls 36 and 38 to help seal off the exit end of the float tank.

It has been found that a reducing atmosphere prolongs the life of the BN coating. BN is susceptible to oxidation which reduces its efficiency. A reducing atmosphere such as the nitrogen-hydrogen mixture mentioned above or sulfur dioxide is beneficial. Also, an evacuated atmosphere can be used to supply reducing conditions.

Additional drapes or curtains 52 of similar material are provided at the entrance end of the lehr 46. In spite of the precautions taken, that is, the use of multiple curtains and drapes and sealing blocks, gases flow from the tank into the lehr. These gases deposit what is believed to be tin compounds, probably tin oxide, on the take-off and lehr rolls.

When the take-off and lehr rolls are treated with boron nitride solutions according to this invention, these deposits are substantially reduced and often eliminated. The reason for this improvement is not completely understood. It may be due to a variety of reasons. For example, there appears to be less tendency for the components of the atmosphere (tin or tin oxide vapors or like low volatile compounds) to condense on the rolls. It may be less easy to wet the roll surface with the vapors produced by a tin metal bath. Also, it is possible that the low shear strength of the boron nitride due to its lattice structure may cause any deposits which are formed to be easily removed from the rolls on initial contact with the glass. Whatever the reason, less or essentially no deposits build up on the rolls and the glass has less defects when a portion or all the rolls immediately adjacent the metal bath are treated with boron nitride, such as disclosed by the invention. In addition, it appears that the rolls have a substantially longer life when treated according to the invention. Once again, the reason for this is not completely understood and may be due to a number of reasons. For example, boron nitride has excellent self-lubricating properties which may reduce the friction of the glass passing over the roll. In addition, boron nitride is an excellent conductor of heat, and it may distribute the heat from the glass sheet more evenly over the roll to minimize any thermal degradation of the roll.

A typical lehr of the type shown in FIG. 3 is approximately 360 feet in length and the rolls are 9 inches in diameter and are journaled on 7 to 12 inch centers, being more closely spaced at and adjacent the entrance of the lehr where the glass is at an elevated temperature and deformable than at the exit end of the lehr where the glass is relatively cold. For example, the glass enters the lehr at a temperature of 1,000°F. to 1,200°F. and exits about 150°F. to 250°F. It is particularly critical that the first 75 or so rolls 48 of the lehr be treated with boron nitride in accordance with the invention. The latter rolls may be untreated, although preferably they too will undergo the boron nitride treatment of the invention, for it has been found that the roll life can be increased greatly by treating these rolls with boron nitride. The exact number of rolls which should be treated with boron nitride depends upon the conditions of operation. Ideally, all rolls which support and engage the glass ribbon at the forward portion of the lehr, where there is a potential exposure to an atmosphere created over the metal pool, should be treated according to this invention. However, even a single roll of the invention, when substituted for a conventional roll in an area shortly after removal of the ribbon from the metal pool, will normally improve the resulting quality of glass obtained.

The above-described invention has been described in particular for lehr rolls and also for take-off rolls in a float glass operation. However, it can be easily seen that the invention is especially applicable to all supporting, handling and/or receiving glass while the glass is at a deformation temperature, that is, temperature at which it will deform or be subject to a marking deformation by contact with solid elements, generally above 900°F., and perhaps as high as 1,600°F. or above. An example of such a roll would be a traction roll in a sheet drawing machine or rolls used in a tempering line. The invention is applicable to supporting, handling and/or conveying glass at lower temperatures as well. Further, although the invention has been described as being particularly useful for asbestos rolls such as described in U.S. Pat. No. 3,317,303 to Shorr and U.S. Pat. No. 3,692,509 to Breiner, it will also be clear that the invention also has applicability to stainless steel rolls such as the conventional type containing from 20 to 25 percent chromium, 12 to 20 percent nickel, and the balance being iron, and also the more exotic alloys, such as those containing about 2 percent iron, at least 10 percent cobalt and at least 3 percent tungsten, such as described in U.S. Pat. No. 3,443,922 to Settino. With certain iron-containing rolls, however, more acidic boron nitride solutions, such as those containing aluminum phosphate binder, should be first passified with a material which will protect the iron-containing roll from the acid environment of the boron nitride-treating solution.

DESCRIPTION OF THE PREFERRED EMBODIMENT

EXAMPLE I

A plurality of discs having an outside diameter of 9 inches and an inside diameter of 6.25 inches were cut from an asbestos board of nominal ¼ inch thickness. The board was made by the wet mix process in which individual layers were laid down one upon the other by successively depositing an asbestos slurry containing a binder upon a screen, then upon the topmost deposited layer until the desired thickness had been built up. The board was then dried, usually under moderate pressure. A Fourdrinier machine may be used for this purpose. The board contained 100 parts by weight of chrysolite asbestos, and 5 parts by weight of calcium silicate as binder. Groups of five discs were nailed together using 4D headed nails, so that the nail points protruded approximately ¼ from one side of the assembly. Groups of discs were then assembled onto a carbon steel mandrel 147 inches in length and about 6.25 inches in outside diameter. A sufficient number of groups of discs were assembled thereon and placed under a pressure of 1,200 pounds per square inch to produce a roll having a length of 141 inches confined between 3-inch collars at the opposite ends thereof. The roll was then lathe turned to an outside diameter of 8 ½ inches. The surface of the roll appeared to be continuous and without indication of its construction of a plurality of discs. The roll surface was dull in appearance after surfacing. There were approximately 700 discs in the finished roll.

An aqueous boron nitride solution was prepared as follows: A commercially available aqueous gel of boron nitride and binder from Carborundum Corporation, sold under the trademark COMBAT Type A coating, contained 37 ½ percent by weight BN, 12 ½ percent by weight aluminum phosphate binder, and 50 percent by weight water. The gel was diluted with distilled water at a ratio of 5 parts by weight gel to 1 part by weight water. The diluted solution was sprayed onto the asbestos roll, which was prepared as described above. Spraying was done with a Binks No. 7 gun and an air pressure of 20 pounds per square inch. Three spray coatings of approximately 0.5 to 1.5 mils wet thicknesses were applied, and an air drying period of about 12 hours was permitted between coatings. After the second coating was applied, it was air dried for 2 hours, and then heated at 200°F. for 4 hours, and then heated to 1,500°F. for an additional two hours to develop maximum hardness in the coating. The final coating thickness (dry thickness) on the roll was approximately 3 mils. The asbestos roll was then inserted in the forward portion of a float glass annealing lehr which was operated at a temperature of about 1,200°F. Upon continuous operation for a period of 26 weeks, there was no evidence of deposit buildup on the roll, nor was there any evidence of roll scuffing or roll imprinting on the bottom side of the float glass sheeting. In comparison, when a similar asbestos, but untreated, lehr roll was used in relatively the same position in the annealing lehr, deposits from the float glass tank quickly built up on the rolls and roll imprinting was quickly noticed on the bottom surface of the float glass sheet after only about 4 weeks of operation.

EXAMPLE II

A similar experiment was conducted with a different boron nitride solution. The solution was prepared by diluting a boron nitride gel commercially available from Carborundum Corporation under the trademark COMBAT type S coating. The gel was diluted with about 3 parts by weight of distilled water for each part by weight of commercially available solution. The Type S coating gel as supplied contained 42 ½ percent by weight BN, 7 ½ percent by weight alumina binder, and about 50 percent by weight water. The diluted solution was applied by spray coating to an asbestos lehr roll, as generally described in Example I. The spraying was done with a Binks No. 7 gun and air pressure at 20 pounds per square inch. Three spray coatings, each having a thickness of about 0.5 to 2 mils, were applied to the roll with an air drying period of about 20 minutes between coatings. After the second coating was applied, the roll was air dried for 6 hours at room temperature, and then at 200°F. for 4 hours. The roll was then baked at 850°F. for 2 hours. The final dry coating thickness on the lehr roll was about 5 mils. The lehr roll was then positioned in the middle portion of an annealing lehr, where the operational temperature was about 600°F. The roll performed quite well and showed no signs of inducing any roll scuffing to the float glass sheet which passed over it.

Besides first coating the rolls and then putting them into operation as take-off or lehr rolls, the rolls could be coated while in actual operation. A deflector could be positioned over the rolls to protect them from the glass and the rolls coated. The roll environment will cure the coating thus avoiding the need for a separate curing cycle.

Although the invention has been described in the above two working examples in the form of a boron nitride coating applied to an asbestos covering, it should be clear that the invention can be practiced in a number of other fashions. For example, the boron nitride in powder, fiber or solution form can be combined with asbestos in the wet mix process, such as described in Example I, and made into board from which the discs are cut. When boron nitride solutions are employed for this purpose, less binder for the asbestos may have to be used because of the binder contained in the boron nitride solutions. In general, asbestos discs can be prepared containing from about 1 to 50 percent by weight boron nitride based on weight of asbestos. Further, the boron nitride in fiber form could be matted or woven into a sleeve and slipped over a suitable roll such as an asbestos or stainless steel roll as described above.

EXAMPLE III

A stainless steel take-off roll such as shown in FIG. 3 for taking off float glass from the float glass bath and supporting and conveying it to an annealing lehr is spray coated with the boron nitride solution of working Example I. The roll is about 147 inches long and 9 inches in external diameter. The roll has a sandblasted surface so as to provide sites for mechanical bonding of the coating to the roll. Spray coating is conducted as generally described in Example I, and the final dry coating thickness is about 3 mils. Baking and curing are also as described in Example I. When placed in operation, the take-off roll shows no evidence of any buildup, nor any evidence of roll imprinting on the float glass sheet which passed over it. For purposes of comparison, an untreated stainless steel take-off roll is quickly deposited with a buildup, which transfers to the glass resulting in roll imprinting. When attempts are made to scrape these deposits from the rolls with graphite blocks, the graphite transfers to the bottom surface of the glass, resulting in a very difficult removal operation since the graphite is not water-soluble. On the other hand, any boron nitride which transfers to the glass can easily be washed away with water.

Although in the above examples spray coating has been disclosed as the method for applying BN to the roll surface, it should be clear that other coating methods such as brushing and dip coating may be used. Also, coating by ionic sputtering, by plasma jet and by chemical vapor deposition could be used and would be particularly applicable with metal rolls.

I claim:

1. A roll, useful in glass manufacturing and especially adapted for supporting and conveying at elevated temperature flat glass sheeting, said roll having an asbestos surface with a coating of boron nitride adhered thereto.

2. A lehr roll as described in claim 1.

3. A take-off roll as described in claim 1 for a float glass-producing line for use adjacent a bath of molten metal to remove a ribbon of glass therefrom.

4. The roll of claim 1 in which the boron nitride coating is from 1 to 10 mils in thickness.

5. The roll of claim 1 in which the asbestos is selected from the class consisting of chrysolite asbestos, anthophyllite asbestos, amosite asbestos, tremolite asbestos, actinolite asbestos and mixtures thereof.

6. An apparatus for the treatment of hot glass sheeting which includes as a principal supporting and conveying means for said sheeting a plurality of rolls as described in claim.

7. The roll of claim 1 in which the asbestos is at least 30 percent by weight anthophyllite asbestos.

8. The apparatus of claim 6 which is an annealing lehr.

* * * * *

UNITED STATES PATENT OFFICE
CERTIFICATE OF CORRECTION

Patent No. 3,853,525                    Dated December 10, 1974

Inventor(s) Harold R. Gorman

It is certified that error appears in the above-identified patent and that said Letters Patent are hereby corrected as shown below:

Claim 6, line 4, insert --1-- after "claim".

Signed and sealed this 18th day of March 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,853,525            Dated December 10, 1974

Inventor(s)   Harold R. Gorman

It is certified that error appears in the above-identified patent and that said Letters Patent are hereby corrected as shown below:

Please insert after "Inventors: Robert M. Bonaddio, Monroeville;
Laverne O. Parkhill, Lower Burrell,
both of Pa."

--[73] Assignee: PPG Industries, Inc., Pittsburgh, Pa.--

Signed and Sealed this twenty-third Day of December 1975

[SEAL]

Attest:

RUTH C. MASON
*Attesting Officer*

C. MARSHALL DANN
*Commissioner of Patents and Trademarks*